United States Patent
Kumar

(10) Patent No.: US 12,263,798 B2
(45) Date of Patent: Apr. 1, 2025

(54) PLURAL BUS ARRANGEMENT FOR ELECTRICAL SUPPLY IN A VEHICLE

(71) Applicant: Transportation IP Holdings, LLC, Norwalk, CT (US)

(72) Inventor: Ajith Kuttannair Kumar, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/331,304

(22) Filed: May 26, 2021

(65) Prior Publication Data

US 2021/0380054 A1    Dec. 9, 2021

Related U.S. Application Data

(60) Provisional application No. 63/034,703, filed on Jun. 4, 2020.

(51) Int. Cl.
*B60R 16/033* (2006.01)
*H02J 1/10* (2006.01)
(Continued)

(52) U.S. Cl.
CPC .............. *B60R 16/033* (2013.01); *H02J 1/10* (2013.01); *H02J 3/00* (2013.01); *H02J 7/0013* (2013.01); *H02M 3/158* (2013.01); *H02M 7/5387* (2013.01)

(58) Field of Classification Search
CPC ... B60R 16/033; H02J 1/10; H02J 3/00; H02J 7/0013; H02M 3/158; H02M 7/5387
(Continued)

(56) References Cited

U.S. PATENT DOCUMENTS

2012/0001480 A1* 1/2012 Favaretto .............. B60L 15/007
                                                               307/9.1
2014/0084679 A1* 3/2014 Li .......................... B60L 50/90
                                                               307/10.1
(Continued)

FOREIGN PATENT DOCUMENTS

DE    112013006718 T5    11/2015
EP         3640075 A1     4/2020
(Continued)

OTHER PUBLICATIONS

European Search Report for related European Patent Application No. 21177716.4 dated Oct. 22, 2021 (9 pages).
(Continued)

*Primary Examiner* — Michael R. Fin
(74) *Attorney, Agent, or Firm* — K&L Gates LLP

(57) ABSTRACT

An electric supply system for a vehicle system includes two or more electric energy storage devices. Two or more buses each conductively couple an energy storage device with a corresponding load of plural loads. A controller controls conduction of current from one or more of the energy storage devices to one or more other buses to transfer energy to other energy storage devices or other loads. A method includes directing a first energy storage device of a first power supply assembly to supply electric current to a first bus conductively coupling the first energy storage device to one or more first loads onboard the vehicle system. The method further includes conducting the electric current from the first energy storage device to one or more second buses of one or more second power supply assemblies to recharge one or more second energy storage devices or power one or more second loads.

11 Claims, 16 Drawing Sheets

(51) Int. Cl.
   *H02J 3/00*     (2006.01)
   *H02J 7/00*     (2006.01)
   *H02M 3/158*     (2006.01)
   *H02M 7/5387*    (2007.01)

(58) Field of Classification Search
   USPC .......................................................... 307/9.1
   See application file for complete search history.

(56) References Cited

U.S. PATENT DOCUMENTS

| | | | | |
|---|---|---|---|---|
| 2018/0354436 | A1* | 12/2018 | Sato | H02H 7/268 |
| 2019/0185025 | A1* | 6/2019 | Kumar | B61C 17/12 |
| 2019/0337403 | A1* | 11/2019 | Tanaka | H01M 8/04303 |
| 2020/0091853 | A1 | 3/2020 | Yoshida et al. | |
| 2020/0220230 | A1* | 7/2020 | Akaishi | H01M 10/443 |
| 2020/0313457 | A1* | 10/2020 | Kozuki | H02J 7/0047 |
| 2022/0097676 | A1* | 3/2022 | Gesang | B60W 20/14 |

FOREIGN PATENT DOCUMENTS

| | | | |
|---|---|---|---|
| JP | 5819022 | B2 | 11/2015 |
| JP | 2020048310 | A | 3/2020 |
| WO | 2014128936 | A1 | 8/2014 |
| WO | 2018229863 | A1 | 12/2018 |

OTHER PUBLICATIONS

English translation of European Patent Application No. 112013006718 downloaded Oct. 21, 2021 (24 pages).
Office Action mailed May 23, 2022 for corresponding JP Patent Application No. 2021-093069, machine translation (15 pages).
Office Action for corresponding JP Application No. 2021-093069 dated Nov. 24, 2022.
First Examination Report for corresponding IN Application No. 202114024320 dated Dec. 21, 2022 (5 pages).
Office Action for corresponding JP Application No. 2021-093069 dated May 18, 2023 (9 pages).
Office Action for corresponding CN Application No. 202110626908.3 dated Jun. 30, 2023 (21 pages).
Office Action received for related EP Application No. 21177716.4 dated Mar. 16, 2023 (6 pages).
Office Action for corresponding EP Application No. 21177716.4 dated Jan. 30, 2024 (7 pages).
Second Office Action for corresponding CN Application No. 202110626908.3 dated Jan. 6, 2024 (16 pages).

\* cited by examiner

PLURAL BUS ARRANGEMENT FOR ELECTRICAL SUPPLY IN A VEHICLE

CROSS REFERENCE TO RELATED APPLICATION

This application claims priority to U.S. Application 63/034,703, filed 4 Jun. 2020, the entire contents of which are incorporated herein by reference.

BACKGROUND

Technical Field

The disclosed subject matter described herein relates to an electric supply system, for example an electric supply system for a vehicle system.

Discussion of Art

Some vehicle systems include electric supply systems that include numerous battery assemblies to supply some or all of requisite propulsion power. The electric supply systems may supply electric energy to auxiliary systems of the vehicle system.

Electric supply systems that utilize a number of battery cells can be used to power auxiliary systems of the vehicle system while the vehicle system is idling. This may deplete the energy storage of the battery cells powering the auxiliary systems which may require the auxiliary systems to be powered down even if there is sufficient stored energy in other battery cells. It may be desirable to have a system and method that differs from those that are currently available.

BRIEF DESCRIPTION

In accordance with one embodiment, an electric supply system for a vehicle system may include two or more energy storage devices configured to store electric energy onboard one or more vehicles of the vehicle system and two or more buses each conductively coupling an energy storage device of the two or more energy storage devices with a corresponding load of a plurality of loads of the vehicle system. The electric supply system may further include a controller configured to control conduction of electric current from one or more of the energy storage devices to one or more other buses to transfer energy to other energy storage devices or to other loads of the one or more other buses.

In accordance with one embodiment, a vehicle system electric supply system may include a plurality of power supply assemblies provided on one or more vehicles of the vehicle system. Each of the power supply assemblies may include a battery assembly including rechargeable energy storage devices, two or more converters coupled to the battery assembly, one or more loads on one or more vehicles of the vehicle system, each load coupled to at least one converter, and a bus conductively coupled with the battery assembly and the two or more converters, wherein at least one of the converters of each power supply assembly is coupled to at least one bus of one other power supply assembly. The vehicle system electric supply system may further include a controller coupled to each of the plurality of power supply assemblies and configured to control conduction of electric current from at least one rechargeable energy storage device of one power supply assembly to a) at least one other rechargeable energy storage device to charge the other rechargeable energy storage device orb) one or more loads of the one or more power supply assemblies.

In accordance with one embodiment, a method can include directing a first energy storage device of a first power supply assembly of a plurality of power supply assemblies provided onboard a vehicle system to supply electric current to a first bus conductively coupling the first energy storage device to one or more first loads onboard the vehicle system. The method may further include conducting the electric current from the first energy storage device to one or more second buses of one or more second power supply assemblies of the plurality of power supply assemblies to recharge one or more second energy storage devices or to power one or more second loads of the one or more second power supply assemblies conductively coupled to the one or more second buses, the second loads being onboard the vehicle system.

BRIEF DESCRIPTION OF THE DRAWINGS

Reference may be now made briefly to the accompanying drawings, in which.

DETAILED DESCRIPTION

Embodiments of the subject matter described herein relate to an electric supply system that includes power supply assemblies that may power loads, for example loads of a vehicle system. The power supply assemblies include energy storage devices, for example rechargeable battery assemblies, that may be controlled to power the loads. The loads may be traction motors of the vehicle system but can also be auxiliary motors that are powered to perform work other than propulsion of the vehicle system or may be other devices. Separate buses conductively couple a battery assembly of a power supply assembly to one or more motors within the power supply assembly. Each battery assembly may separately power a different motor or set of motors than the other battery assemblies. For example, a first battery assembly may include one or more first battery assemblies and a first bus that conductively couples and conducts current from the one or more first battery assemblies to a first motor or first set of motors. A second battery assembly of the same vehicle may include one or more second battery assemblies and a second bus that conductively couples and conducts current from the one or more second battery assemblies to a second motor or second set of motors. The system may include several more battery assemblies.

A controller can control conduction of electric current from a first power supply assembly to a second power supply assembly when the second power supply assembly does not have sufficient stored energy to power the loads coupled to the second power supply assembly or if there is a failure in the energy storage components or systems. If the vehicle system is idled for a period of time it may still be necessary to power auxiliary loads, such as HVAC systems and control systems. If the energy storage devices powering the auxiliary loads is depleted while the vehicle system is idling, it may be necessary to power down the auxiliary loads even though there is a need to maintain power to the auxiliary loads. The electric supply system provides power to the auxiliary loads from energy storage devices of the power supply assemblies that have stored energy available, for example from energy storage devices that may be connected to traction motors that may be idled.

The electric supply system allows energy from one or more energy storage devices of a first power supply assembly or group of first power supply assemblies to be transferred to a second power supply assembly or group of second power supply assemblies to recharge a battery assembly or assemblies of the second power supply assembly or assemblies and/or to provide power to an auxiliary load or loads of the second power supply assembly or assemblies. The power may be transferred through converters that are coupled between the battery assemblies and the loads, for example between the battery assemblies and the traction motors and/or between the battery assemblies and the auxiliary loads.

Figure 1:
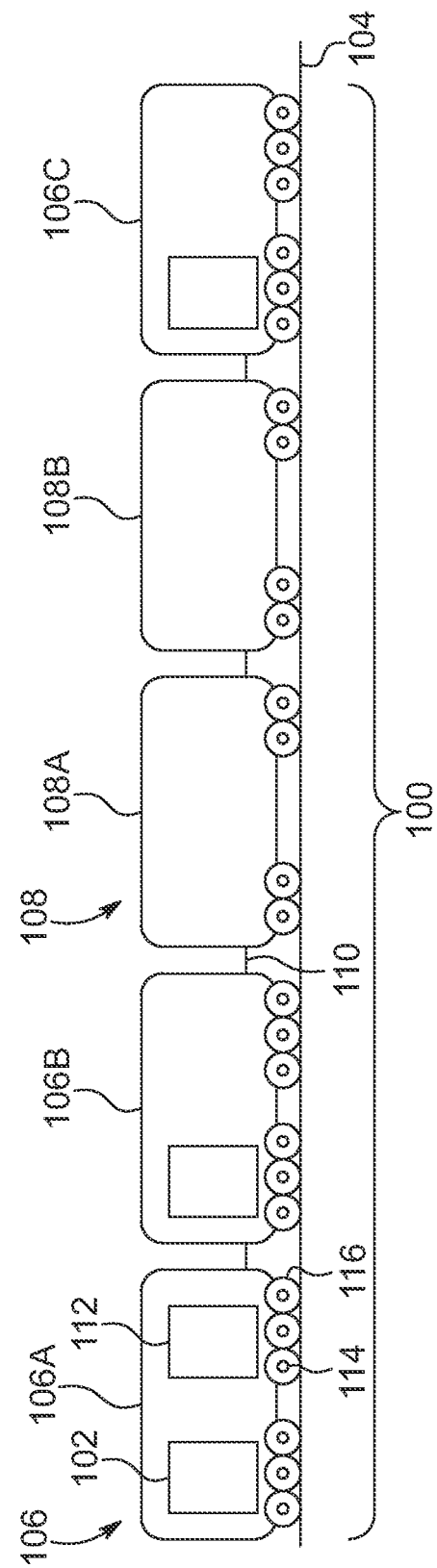
FIG. 1 is a schematic diagram of a vehicle system in accordance with one embodiment.

FIG. 1 is a schematic diagram of a vehicle system 100 having a traction control system 102 according to one embodiment. The method 200 of powering a vehicle illustrated in FIG. 2 may be performed by one or more embodiments of the traction control system 102. The vehicle system represents a vehicle group. The vehicle group in the illustrated embodiment includes plural propulsion-generating vehicles 106 (e.g., vehicles 106A-C) and non-propulsion-generating vehicles 108 (e.g., vehicles 108A-B) mechanically coupled together by couplers 110 while the vehicle system moves along a route 104. While the description herein describes a vehicle system being a rail vehicle group having locomotives as the powered vehicles and railcars as the non-powered vehicles (and the vehicle group is a train), alternatively, one or more embodiments described herein may be applied to other types of vehicle groups and/or vehicles. These other vehicle groups may include one or more off-highway vehicles (e.g., mining vehicles or other vehicles that may be not designed or legally permitted for travel on public roadways), marine vessels, automobiles, trucks, aircraft, or the like. Additionally, the vehicle system may be formed from a single vehicle instead of multiple vehicles. Optionally, in a vehicle system formed from several vehicles, the vehicles may be separate from each other but virtually or logically coupled with each other in that the vehicles communicate with each other to coordinate their movements with each other (so that the separate vehicles move together as a larger vehicle system, or convoy, along the routes).

The vehicles include propulsion systems 112 having traction motors (shown and described below) operably coupled with axles 114 and/or wheels 116 of the vehicles. The traction motors may be connected with the axles and/or wheels via one or more gears, gear sets, or other mechanical devices to transform rotary motion generated by the traction motors into rotation of the axles and/or wheels to propel the vehicles and, consequently, the vehicle system. Different traction motors may be operably connected with different axles and/or wheels such that traction motors that may be deactivated (e.g., turned off) do not rotate corresponding axles and/or wheels while traction motors that remain activated (e.g., turned on) rotate corresponding axles and/or wheels.

Figure 2:
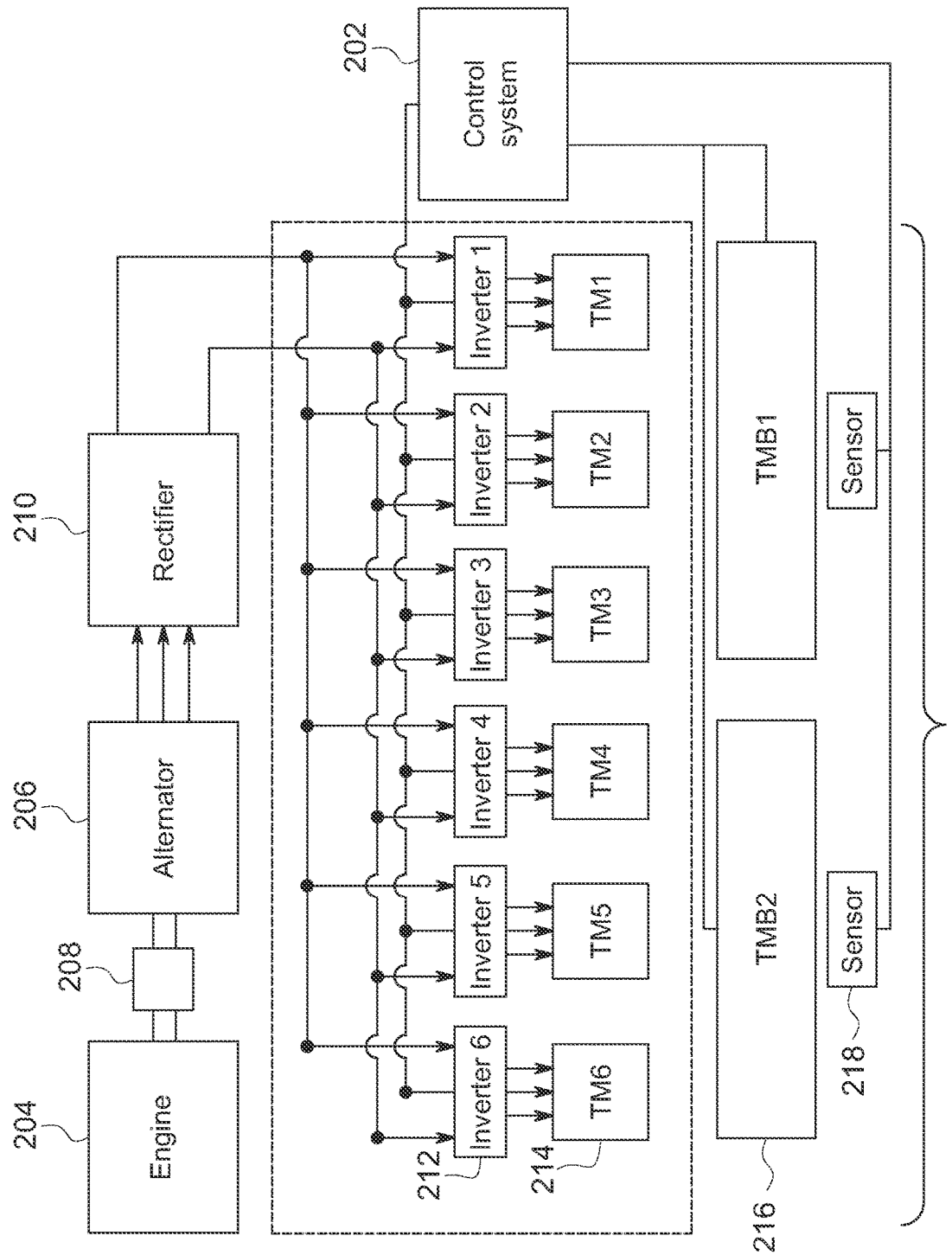
FIG. 2 is a circuit diagram of a propulsion system in accordance with one embodiment.

FIG. 2 illustrates a circuit diagram of a propulsion system 200 and a traction control system 202. In one example the propulsion system may utilize a diesel engine. The propulsion system may include one or more engines 204 that may be operably connected with an alternator or generator 206 ("Alternator" in FIG. 2) by one or more transmission members 208 (e.g., shafts and/or gears, or the like). The engine rotates the shaft or other transmission member to cause the alternator or generator to generate electric current. This electric current may be supplied to a rectifier 210, which then supplies the current to several inverters 212 ("Inverter 1," "Inverter 2," "Inverter 3," "Inverter 4," "Inverter 5," and "Inverter 6" in FIG. 2). The inverters 212 may be connected with different traction motors 214 ("TM1," "TM2," "TM3," "TM4," "TM5," and "TM6" in FIG. 2) in the illustrated embodiment. The inverters also may be operably connected with the control system. The control system can control which traction motors may be activated or deactivated, the level of power they receive, the torque they may generate, the phase width modulation of the current, the thermal output of the traction motor, the overall voltage applied to the traction motor, and even the phase and cycle rate of the current supplied to the traction motor. Additionally, the control system may control other aspects of the operating state of the traction motors via control signals that may be communicated to the inverters. For example, the control system can communicate different control signals to different inverters via one or more wired and/or wireless connections to individually control (a) which ones of the inverters activate the corresponding traction motors, (b) which inverters deactivate corresponding traction motors, (c) the current supplied from the inverters to the corresponding traction motors (e.g., to control the power outputs from the traction motors), and the like. Of note, that while the term traction motor is used herein, it includes other motors—such as a motor that provides torque to, for example, a drive shaft of a marine vessel or a rotor on an aircraft.

One or more traction motor blowers 216 ("TMB1" and "TMB2" in FIG. 2) represent fans that move air toward the traction motors to cool the traction motors. One traction motor blower may cool several traction motors in one embodiment. The speeds at which the traction motor blowers operate may be controlled via control signals communicated from the control system to the traction motor blowers. Several temperature sensors 218 sense or measure the operating temperatures of the traction motors and generate data representative of the operating temperatures of the traction motors. This data can be communicated to the control system. As described above, the control system can at least partially base the selection of which traction motors to turn on or off based on the operating temperatures of the traction motors.

As described above, the control system can deactivate one or more traction motors and/or change the operating state of traction motors so that the combined power output of the activated traction motors meets or exceeds the tractive load demanded by the vehicle system. Doing so can increase the efficiency of the propulsion system relative to propelling the vehicle system with a larger number of activated traction motors.

In retrofitting a diesel-powered locomotive to a purely battery powered locomotive (or other vehicles), the diesel engine, alternator or generator, shafts, and rectifiers of this propulsion system may be replaced with an energy storage device. New vehicles may be designed to operate only on power from an energy storage device(s) (i.e., without an engine) or on a combination of power from an energy storage device(s) and engine power. Suitable energy storage devices include, for example, a battery, a set of batteries, a fuel cell, capacitors, and the like. For convenience, energy storage devices may be referred to as battery systems and/or sets of batteries throughout.

Figure 3:
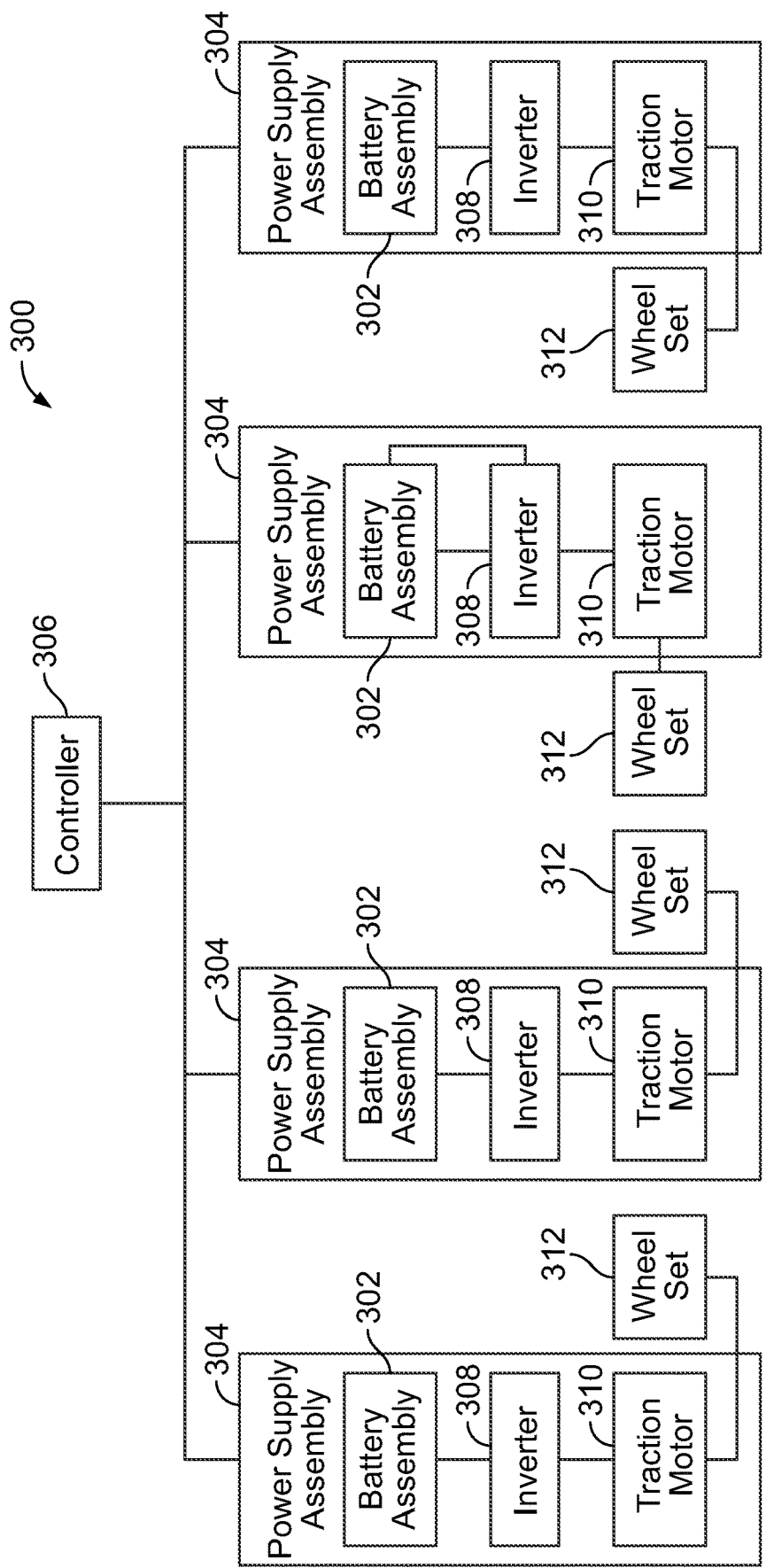
FIG. 3 is a schematic diagram of a vehicle system in accordance with one embodiment.

FIG. 3 illustrates a schematic diagram of a vehicle electric supply system 300, or energy system, that separates the set off batteries into separate battery assemblies 302 that each power an individual power supply assembly 304. As illustrated in FIG. 3, each power supply assembly may be physically and electrically separate from the other power supply assemblies. Instead, each power supply assembly may be operatively coupled to a controller 306. The controller may control each of the power supply assemblies such that different power supply assemblies may have different inputs and/or outputs as required during operation of the vehicle to optimize vehicle performance. In this manner, the battery assemblies may be varied as may be required for an individual power supply assembly.

A suitable battery assembly may include many strings of batteries. Each power supply assembly includes at least a battery assembly, an inverter 308, a traction motor 310, and a wheel set 312. Optionally, a power supply assembly may include more than one traction motor, auxiliary motors, or the like as will be described in more detail in relation to FIG. 4. By isolating the power supply assemblies from one another, when decreased performance or fault in one battery assembly, inverter, traction motor, wheel set, or the like occurs, the controller may be able to power the other power supply assemblies to continue operation of the vehicle without complete shutdown, or fault. Similarly, each individual power supply assembly may be maintained, charged, repaired, and the like depending upon power usage within the individual power supply assembly. Therefore, the controller may determine when a battery assembly of one power supply assembly has low or reduced charge or power, and thus does not operate that power supply assembly until maximum power may be needed for the locomotive. Alternatively, the controller may determine that a power supply assembly will be charged at an upcoming stop and thus prioritize using that power supply assembly to utilize as much power as possible in the power supply assembly before charging. Alternatively, the controller may prioritize a power supply assembly to another function that may include an auxiliary motor that powers an auxiliary system of the vehicle or some other electrical system. In one example the vehicle may be a locomotive and the auxiliary motor operates the heating and air-conditioning of the locomotive. In another example, the vehicle is an on-road passenger vehicle and the auxiliary system is a communication and navigation system. In either example, the controller maintains power within the power supply assembly to ensure that the auxiliary function remains available, even in a non-propel state.

The following description made with reference to FIGS. 4-14 includes references to the drawings for explanatory purposes. Not all features of the embodiments disclosed are shown in every figure. Features which are not required to describe certain aspects of the embodiments as depicted in a drawing may be omitted from the drawing being described, however the aspects and features discussed in any one drawing may be applicable to the aspects and features of any other drawing or drawings.

Figure 4:
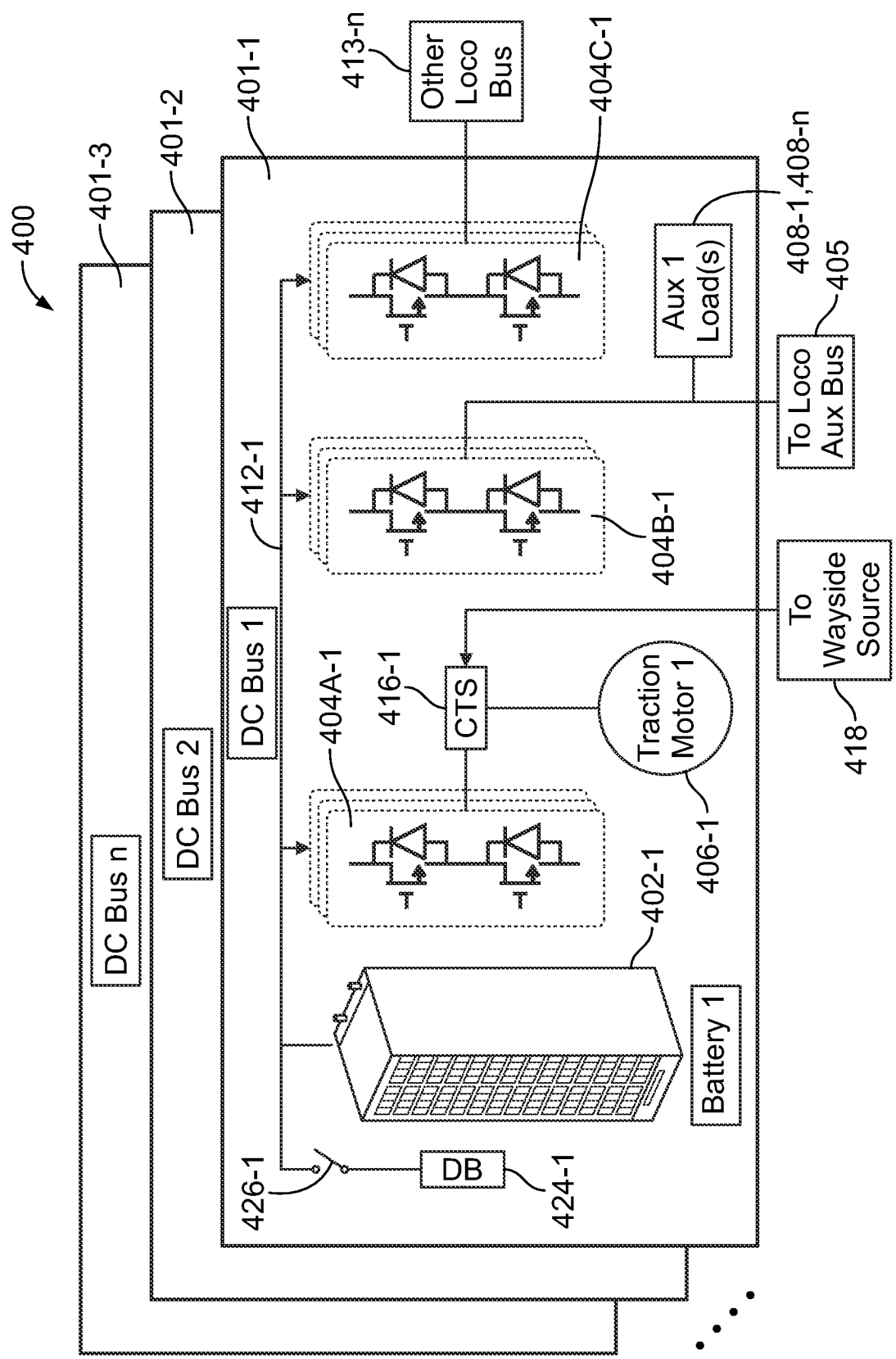
FIG. 4 is a schematic diagram of an electric supply system in accordance with one embodiment.

Referring to FIG. 4, an electric supply system 400, for example for a vehicle system as described herein, may include a plurality of power supply assemblies 401-1, 401-2, 401-3. As shown in FIG. 4, the electric supply assembly includes three power supply assemblies, but the electric supply system may include any plurality of power supply assemblies of two or more. The components of each power supply assembly are designated in the drawings by -1, -2, -3, -n, to distinguish the components of one power supply assembly from the components of another power supply assembly. The following description of FIG. 4 refers to a first power supply assembly 401-1 but the description is applicable to the other power supply assemblies 401-2, 401-3. The power supply assemblies may all be provided on one vehicle of the vehicle system or the power supply assemblies may be provided on different vehicles of the vehicle system.

Referring still to FIG. 4, the power supply assembly 401-1 includes an energy storage assembly 402-1, which includes one or more batteries. Each power supply assembly may also include plural converters 404A-1, 404B-1, 404C-1, a traction motor 406-1 that may be one of plural motors, one or more auxiliary devices 408-1, 408-n that may include one or more motors, and a DC bus 412-1.

A connection device 416-1 may be electrically coupled between the DC bus 412-1, the first converter 404A-1, the traction motor 406-1, and a power supply source 418, referred to as a wayside source. The power supply source 418 may be a 3-phase AC source. In other embodiments, the power supply source may be a single-phase AC source or a DC source. In one example the connection device 416-1 may be a transfer switch. Alternatively, or additionally, the power supply source may be provided or coupled to DC bus 412-1 through one or more of the other converters 404B-1, 404C-1. In this example, the power supply source may be coupled to the DC bus 412-1 with the converter 404A-1 and the connection device 416-1 that may be configured to couple with the power supply source offboard the vehicle. Alternatively, or additionally, the power supply source may be connected to the DC bus 412-1 through one or more of the other converters 404B-1, 404C-1, referred to as auxiliary converters. In the case where the power supply source is connected to the DC bus 412-1 through a converter, the power supply source may be any DC or AC source. In a case where the power supply source is connected directly to the DC bus 412-1, the power supply source may need to be a DC source.

The connection device 416-1 may be coupled between the power supply source and the first converter 404A-1, referred to as the traction motor converter. The connection device 416-1 may change states between an onboard state that conductively couples the battery assembly 402-1 with the corresponding traction motor 406-1 and an offboard state that conductively couples the corresponding traction motor converter 404A-1 with the power supply source 418. In this manner, the power supply source 418 may be used to recharge the battery assembly 402-1. The connection device 416-1, additionally, disconnects the traction motor 406-1 while the power supply source may be coupled to the traction motor converter 404A-1 for charging the battery assembly 402-1 of a first power supply assembly 401-1, to prevent accidental movement of the vehicle during recharging.

During braking there may be conditions under which the battery assembly 402-1 may be not capable of absorbing all the energy provided by the traction motor 406-1. This could be due the state of charge of the battery assembly 402-1, for example at or near full charge, performance issues with batteries, battery age, higher braking demand than battery capacity, etc. Under these type of conditions, if a dynamic brake grid assembly 424-1 is present it can be electrically coupled to the DC bus 412-1 via a switch 426-1. Thus, when the energy provided by the traction motor 406-1 may be more than what can be stored by the battery assembly 402-1, the remainder may be dissipated in the dynamic brake grid assembly 424-1 as heat.

While the first converter 404A-1 may be coupled to the DC bus 412-1 and traction motor 406-1, the DC bus 412-1 may be utilized to couple the battery assembly 402-1 to the second converter 404B-1 and the third converter 404C-1. In one example, the second converter 404B-1 couples to an auxiliary bus 405 that is connected to one or more auxiliary devices having one or more auxiliary loads 408-1, 408-n. The auxiliary devices 408-1, 408-n may be blowers, pumps, fans, etc. needed for the power supply assembly 401-1. The auxiliary bus 405 is common to all the power supply assemblies 401-n. Auxiliary loads 410-1, 410-n (FIG. 7) such as lights, air-compressors for brake systems, hotel loads, HVAC systems, control systems, or the like that may be useful for the operation of the vehicle can be connected to the auxiliary bus. Often such auxiliary devices may need to operate even when the battery assembly 402-1 of the power supply assembly 401-1 may be powered down. In those circumstances, the auxiliary converter 404B-1 may power the auxiliary bus that, in one example, may be energized from one or more other power supply assemblies, either permanently or selectively.

In another example, the third converter 404C-1 may be used to power a bus 413-n that is provided on another vehicle or may be used when power transfer has to take place from offboard the power supply assembly 401-1 to the DC bus 412-1. In one example, the battery assembly 402-1 may be charged while the vehicle may be moving, such as from a catenary, third rail, another locomotive, another power source such as an auxiliary power unit (APU), or the like. In each example, the first converter 404A-1 may be used to drive the traction motor 406-1 while the auxiliary converter 404C-1 may be used to charge the battery assembly 402-1.

Figure 5:
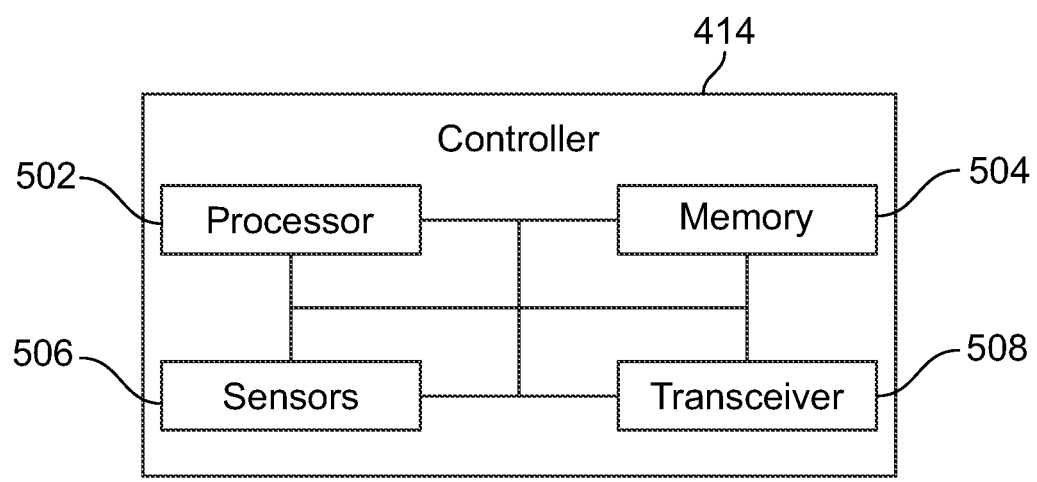
FIG. 5 is a schematic diagram of a controller in accordance with one embodiment.
Figure 6:
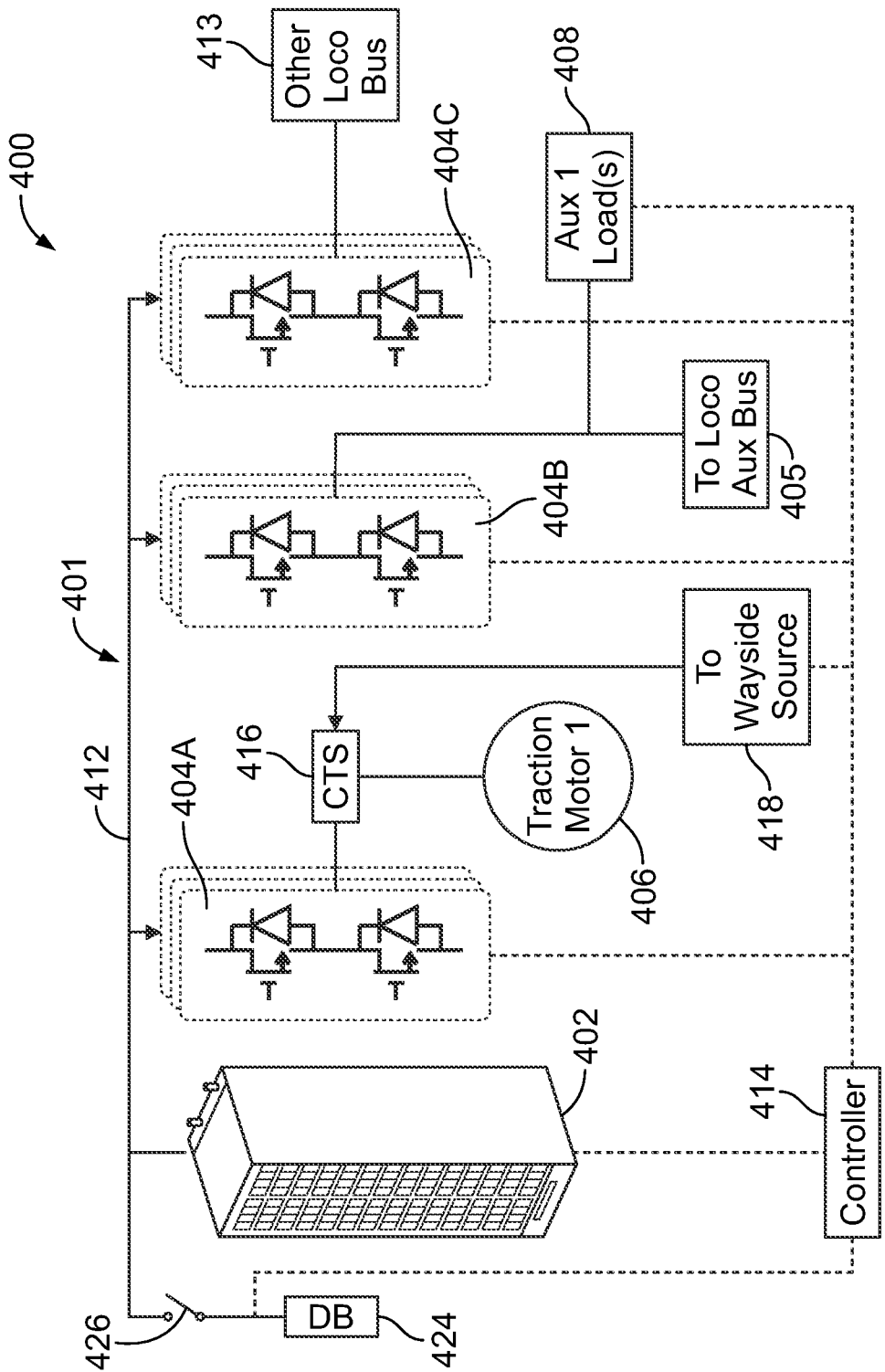
FIG. 6 is a schematic diagram of an electric supply system in accordance with one embodiment.

FIG. 5 illustrates a schematic diagram of a controller 414 for an electric supply system. In one example the controller may be for the electric supply system of FIG. 4. The controller may include one or more processors 502, a memory 504, one or more sensors 506, and a transceiver 508 for communication with plural buses. In one example the plural buses may be the plural busses 412-1, 412-2, 412-3 of FIG. 4. Referring to FIG. 6, the controller may be electrically coupled to the battery assemblies, the traction motors, and/or the auxiliary devices 408 of the electric supply system.

The controller can execute a set of instructions that are stored in one or more memory to process data. For example, the controller may include or be coupled to one or more memories. The memory may store data or other information as desired or needed. The memory may be in the form of an information source or a physical memory element within a processing machine.

The set of instructions may include various commands that instruct the controller as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The one or more processors or controller may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the controller may represent processing circuitry such as one or more of a field programmable gate array (FPGA), application specific integrated circuit (ASIC), microprocessor(s), and/or the like. The circuits in various embodiments may execute one or more algorithms to perform functions described herein. The one or more algorithms may include aspects of embodiments disclosed herein, whether or not expressly identified in a flowchart or a method.

As used herein, the terms "software" and "firmware" are interchangeable and include any computer program stored in a local storage medium (for example, one or more memories) for execution by a computer, including RAM memory, ROM memory, EPROM memory, EEPROM memory, and non-volatile RAM (NVRAM) memory. The above memory types are exemplary only and are thus not limiting as to the types of memory usable for storage of a computer program.

Suitable sensors may be speed sensors, pressure sensors, position sensors, temperature sensors, voltage sensors, current sensors, or the like. Additionally, the transceiver may be a separate receiver and transponder that transmits and receives signals to and from the controller.

Referring to FIG. 6, the controller is electrically coupled to the power supply assemblies 401 of the electric supply system to control conduction of electric current from the battery assemblies 402 to the traction motors 406 of the vehicle system. Specifically, the controller may direct the battery assemblies to conduct electric current as required to meet the propulsion, braking, or hold demands of the vehicle. For clarity, only one power supply assembly is shown in FIG. 6. The controller is connected to and controls all power supply assemblies of the electric supply system. As also shown in FIG. 6, the controller can control the battery assembly, the switch 426 of the dynamic brake grid assembly 424 (if present), the converters 404A, 404B, 404C, the auxiliary loads 408-1, 408-n, and a power supply source 418.

Figure 7:
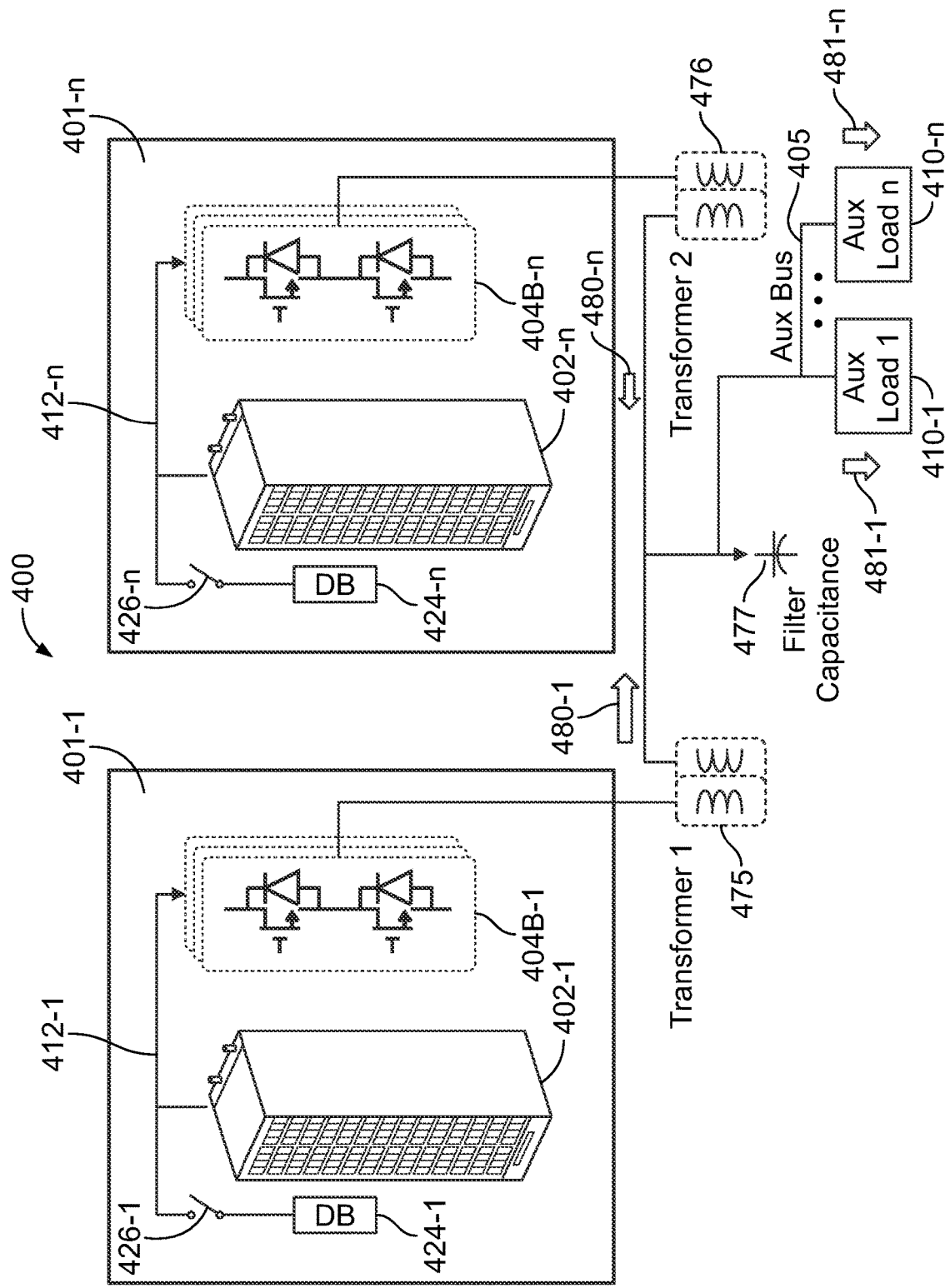
FIG. 7 is a schematic diagram of operation of an electric supply system in accordance with one embodiment.

Referring to FIG. 7, the electric supply system operates to provide power to auxiliary loads 410-1, 410-n by providing electric current from battery assemblies 402-1, 402-n of the power supply assemblies 401-1, 401-n through the auxiliary converters 404B-1, 404B-n. Although two power supply assemblies are shown for clarity, more than two power supply assemblies can provide power for the auxiliary loads 410-1, 410-n. The AC voltage may be stepped up or down by transformers 475, 476 and undesirable frequencies filtered out by a filter capacitance 477. Additional filter components and/or networks using active and passive components may be used. The electric current 480-1, 480-n from each power supply assembly 401-1, 401-n is provided to the auxiliary bus 405 to power the auxiliary loads 408-1, 408-n. The auxiliary loads 408-1, 408-n may require different amounts of electric current 481-1, 481-n. The controller may control the operation of the battery assemblies 402-1, 402-n to provide the required electric current 481-1, 481-n to the individual auxiliary loads 408-1, 408-n, as described in U.S. PGPUB 2020/0254900 A1.

Figure 8:
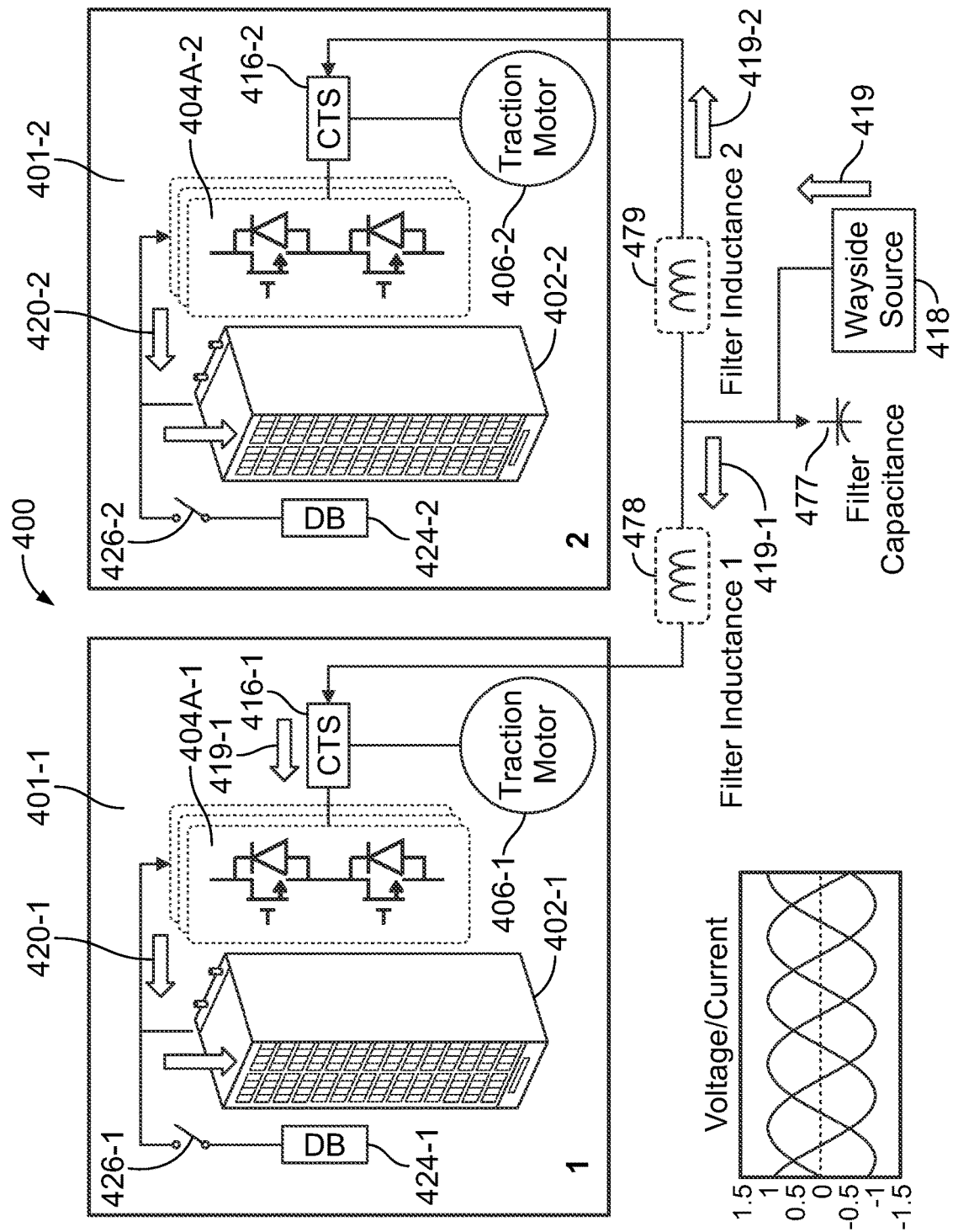
FIG. 8 is a schematic diagram of operation of an electric supply system in accordance with one embodiment.

Referring to FIG. 8, the battery assemblies 402-1, 402-2 may be recharged by the power supply source 418. Only first and second power supply assemblies 408-1 and 408-2 are shown in the drawing for clarity, but the battery assemblies of the power supply assemblies of the electric supply system may be recharged by the power supply source. The power supply source provides electric current 419 to the power supply assemblies. As shown in the drawing, the electric current provided by the power supply source is AC. The electric current 419 is divided into separate currents 419-1, 419-2 for the power supply assemblies 401-1, 401-2. The controller 414 may determine the amount of current to be supplied to each power supply assembly 401-1, 401-2. The currents 419-1, 419-2 may pass through filter inductances 478, 479 and to the first converters 404A-1, 404A-2 through the connection devices 416-1, 416-2. The connection devices 416-1, 416-2 are in their offboard positions to prevent the currents 419-1, 419-2 from powering the traction motors 406-1, 406-2. The controller operates the first converters 404A-1, 404A-2 as rectifiers to convert the AC 419-1, 419-2 to DC 420-1, 420-2 and charge the battery assemblies 402-1, 402-2. In one embodiment, the power supply source may be wireless and/or inductively supplied.

Figure 9:
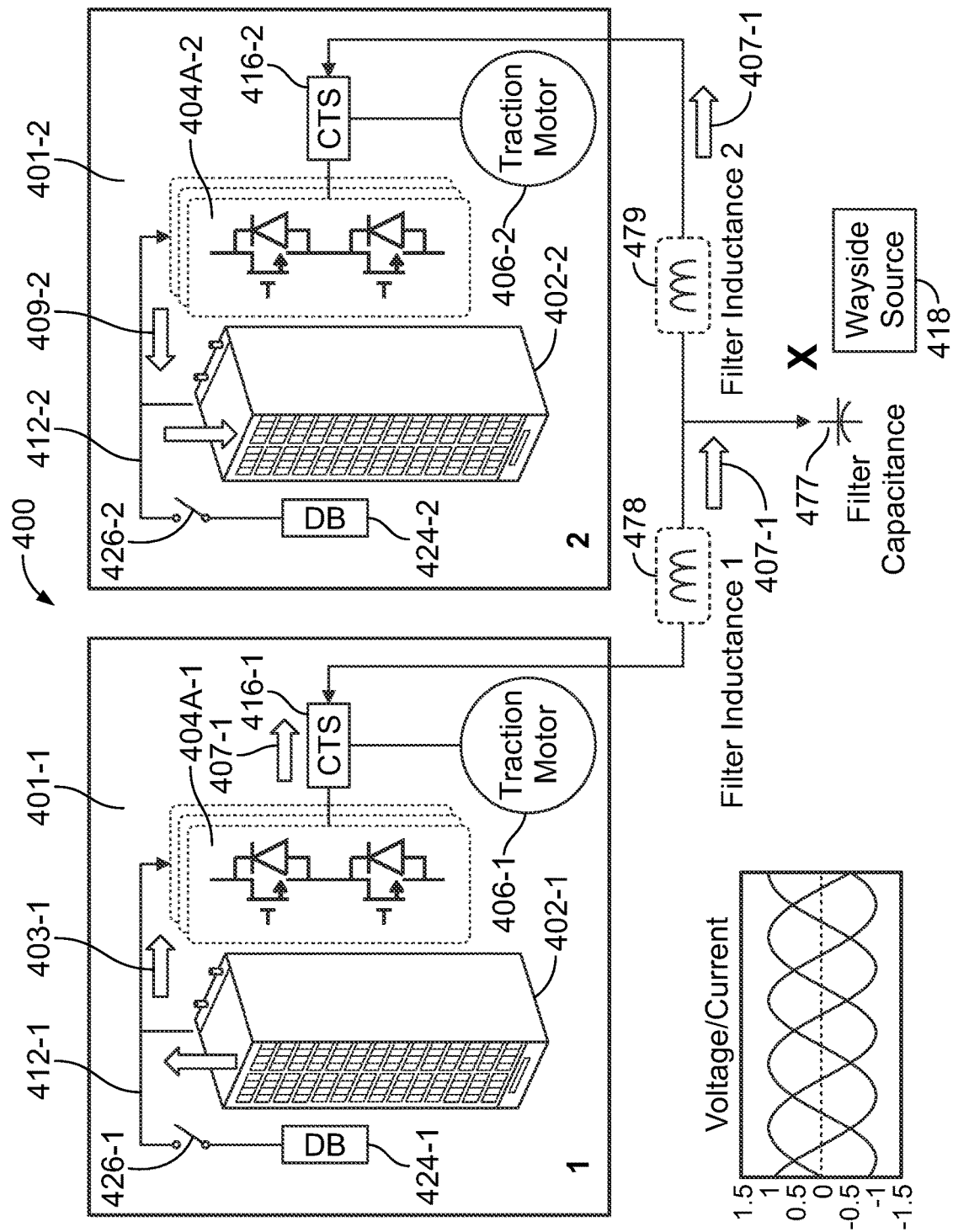
FIG. 9 is a schematic diagram of operation of an electric supply system in accordance with one embodiment.

Referring to FIG. 9, a first power supply assembly 401-1 may charge the battery assembly 402-2 of a second power supply assembly 401-2 of the electric supply system. The power supply source is disconnected from the electric supply system, or no power supply source is available, for example when the vehicle system is not near a charging station. The controller controls the battery supply assembly 402-1 of the first power supply assembly 401-1 to provide current 403-1. The current 403-1 is DC and is inverted by the first converter 404A-1 to a three-phase alternating current (AC) 407-1. The controller places the connection device 416-1 in the offboard position and the AC 407-1 passes through first and second filter inductances 478, 479 to the second power supply assembly 401-2. The connection device 416-2 of the second connection device is also placed in the offboard position by the controller and the controller operates the first converter 404A-2 of the second power supply assembly 401-2 to rectify the three-phase AC 407-1 to DC 409-2 to charge the battery assembly 402-2 of the second power supply assembly 401-2.

Figure 10:
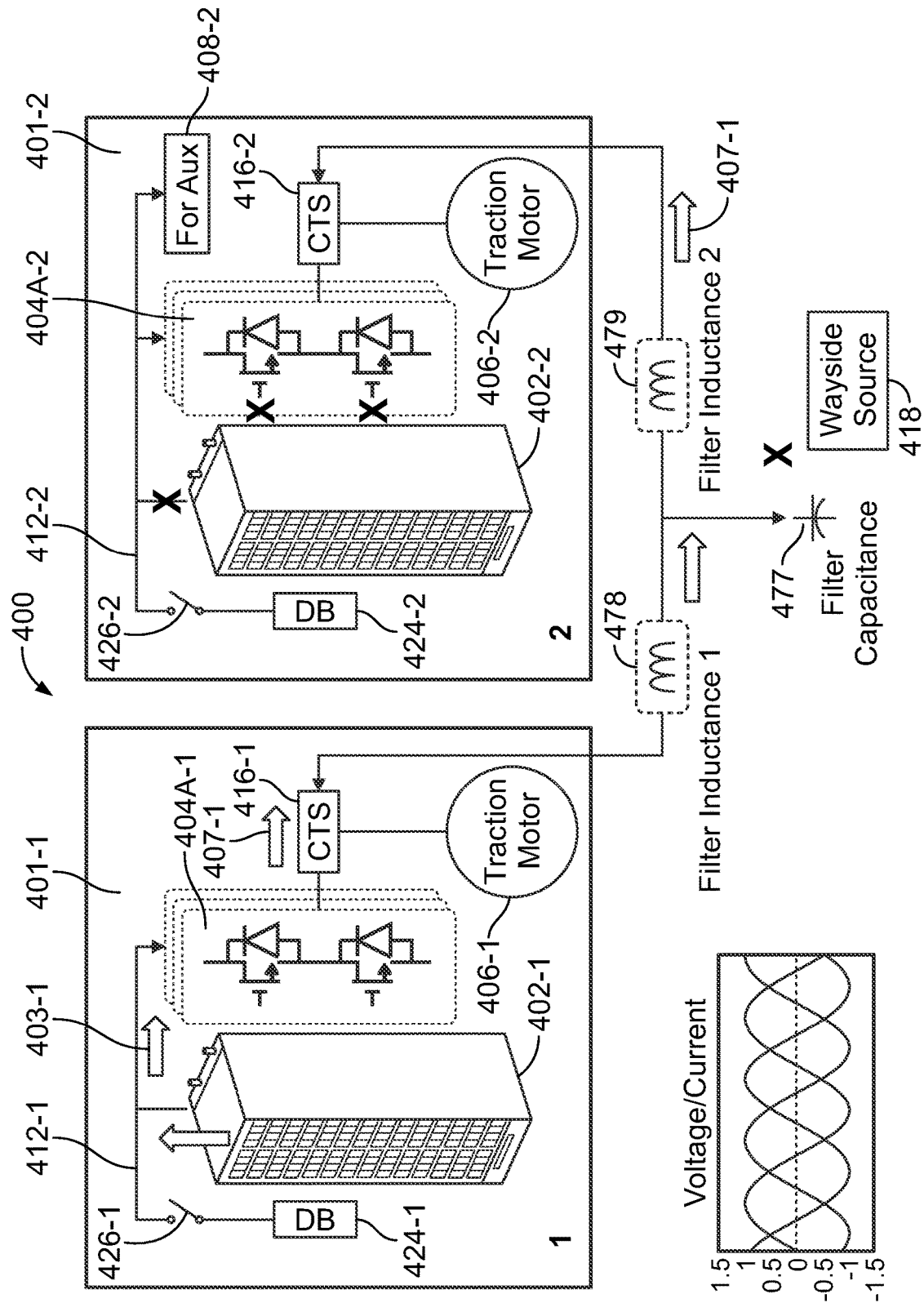
FIG. 10 is a schematic diagram of operation of an electric supply system in accordance with one embodiment.

Referring to FIG. 10, the battery assembly 402-1 of a first power supply assembly 401-1 may be used to power the auxiliary loads 408-2 of a second power supply assembly 401-2 if the battery assembly 402-2 of the second power supply assembly 402-2 does not have sufficient power to operate the auxiliary loads 408-2 or has failed. The DC 403-1 of the battery assembly 402-1 of the first power supply assembly 401-1 is rectified by the first converter 404A-1 to AC 407-1 and passed through filter inductances 478, 479. The controller 414 controls the connection device 416-1 of the first power supply assembly 401-1 to be in the offboard position. The controller 414 also controls the connection device 416-2 of the second power supply assembly to be in the offboard position and the AC 407-1 is provided to the first converter 404A-2 of the second power supply assembly 401-2. The first converter 404A-2 of the second power supply assembly 401-2 is turned off by the controller 414 so the AC 407-1 is provided to one or more auxiliary loads 408-2 of the second power supply assembly 401-2 through the rectifier action of converter 404A-2.

Figure 11:
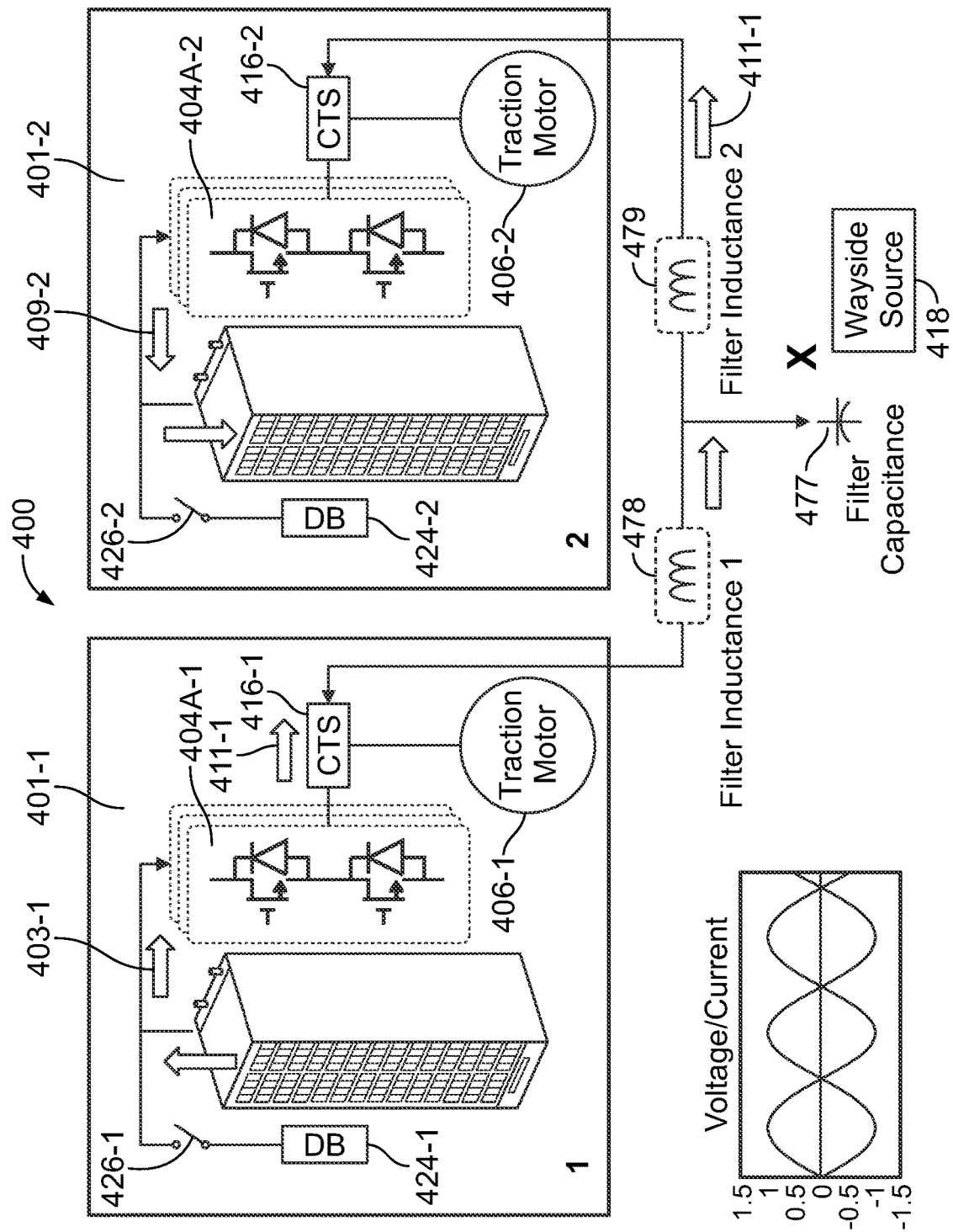
FIG. 11 is a schematic diagram of operation of an electric supply system in accordance with one embodiment.

Referring to FIG. 11, the controller may control the first converter 404A-1 of a first power supply assembly 401-1 to provide a single-phase alternating current (AC) 411-1. The single-phase AC 411-1 passes through filter inductances 478, 479 and is provided to the first converter 404A-2 of a second power supply assembly 401-2. The electric supply system 400 is not connected to the power supply source 418 and the controller places the connection device 416-2 of the second power supply assembly 401-2 in the offboard position. The single-phase AC 411-1 is provided to the traction motor converter 404A-2 of the second power supply assembly 401-2 which rectifies the AC 411-1 to DC 409-2 to charge the battery assembly 402-2 of the second power supply assembly 401-2. This operation is similar to the operation of FIG. 9 except that a single-phase system used instead of a multi-phase (for example 3-phase) used in FIG. 9.

Figure 12:
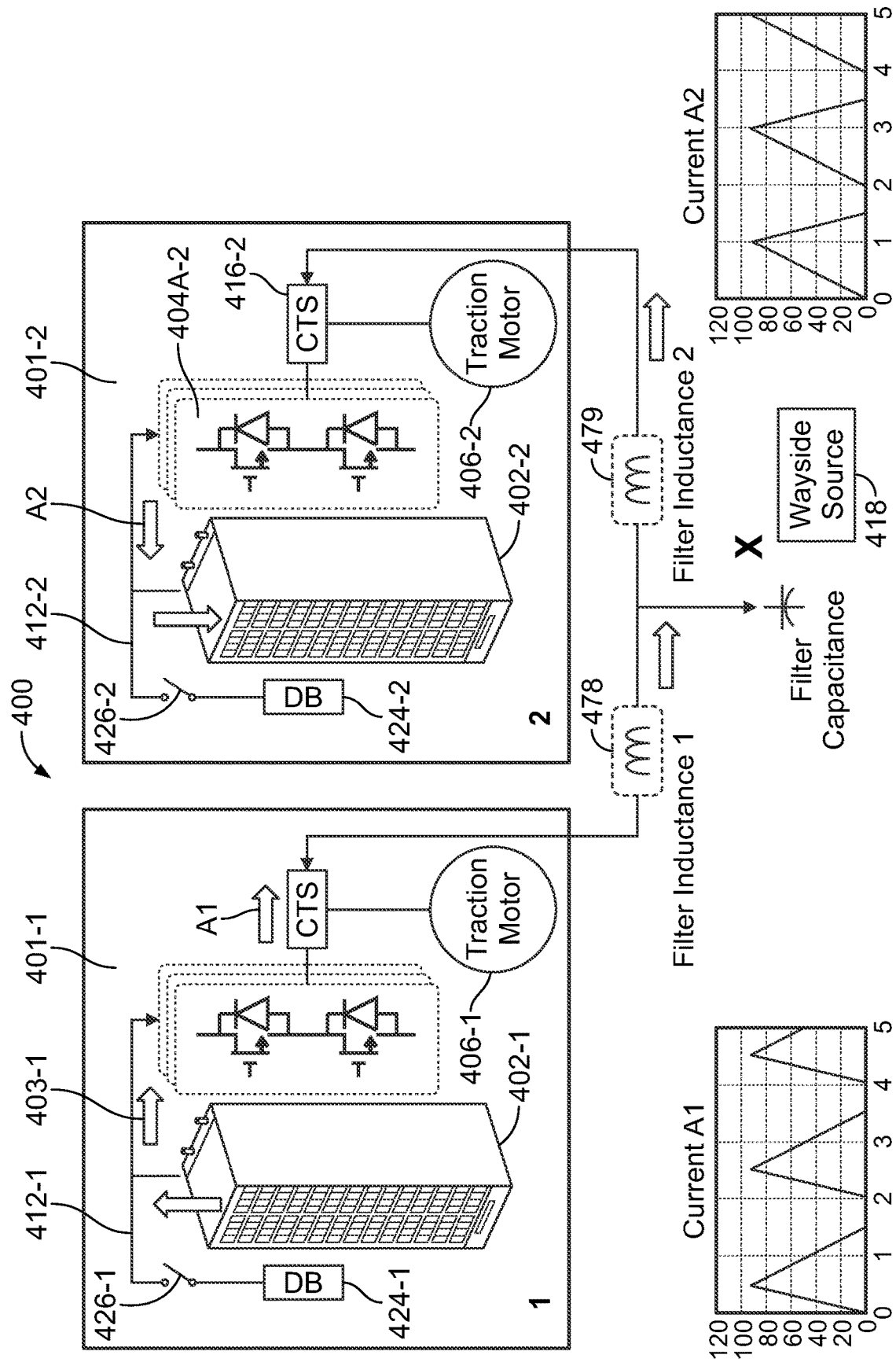
FIG. 12 is a schematic diagram of operation of an electric supply system in accordance with one embodiment.

Referring to FIG. 12, the controller may control the traction motor converter 404A-1 of a first power supply assembly 401-1 and a traction converter 404A-2 of a second power supply assembly 401-2 to operate as a DC connector. The controller may operate the traction motor converter 404A-1 of the first power supply assembly 401-1 to operate cyclically. The current A1 produced in the A-phase of the first converter 404A-1 is shown in the drawing. The current produced in the B- and C-phases of the converter 404A-1 are not shown but it is understood that the B- and C-phase currents may have a similar wave form as the A-phase current A1.

The controller operates the traction motor converter 404A-1 to build up the A-phase current A1. The controller then operates the traction motor converter 404A-1 to allow the current to decrease until the A-phase current A1 is zero. The A-phase current A1 is maintained at zero for an amount of time and the cycle repeats. The controller operates the B- and C-phases of the traction motor converter 404A-1 to produce similar B- and C-phase currents.

The filter capacitance 477 is charged to one third of the voltage of the DC bus 412-1 and the A-phase current A1 passes through the filter inductances 478, 479 to the second DC bus 412-2 through the connection device 416-2 of the second power supply assembly 401-2. The controller operates the traction motor converter 404A-2 of the second power supply 401-2 to provide an A-phase current A2 to the battery assembly 402-2 of the second power supply assembly 401-2 to charge the battery assembly 402-2. As shown in the drawing, the A-phase current A2 provided by the first converter 404A-2 of the second power supply assembly 401-2 lags the A-phase current A1 provided by the traction motor converter 404A-1 of the first power supply assembly 401-1. The B- and C-phase currents provided by the traction motor converter 404A-2 of the second power supply assembly 401-2 similarly lag the B- and C-phase currents provided by the traction motor converter 404A-1 of the first power supply assembly 401-1. In addition to the configuration shown in the drawing, additional ways of configuring the inverters 404A-1, 404A2, filter inductances 478, 479, and filter capacitance 477 are possible to form a DC-DC converter.

Figure 13:
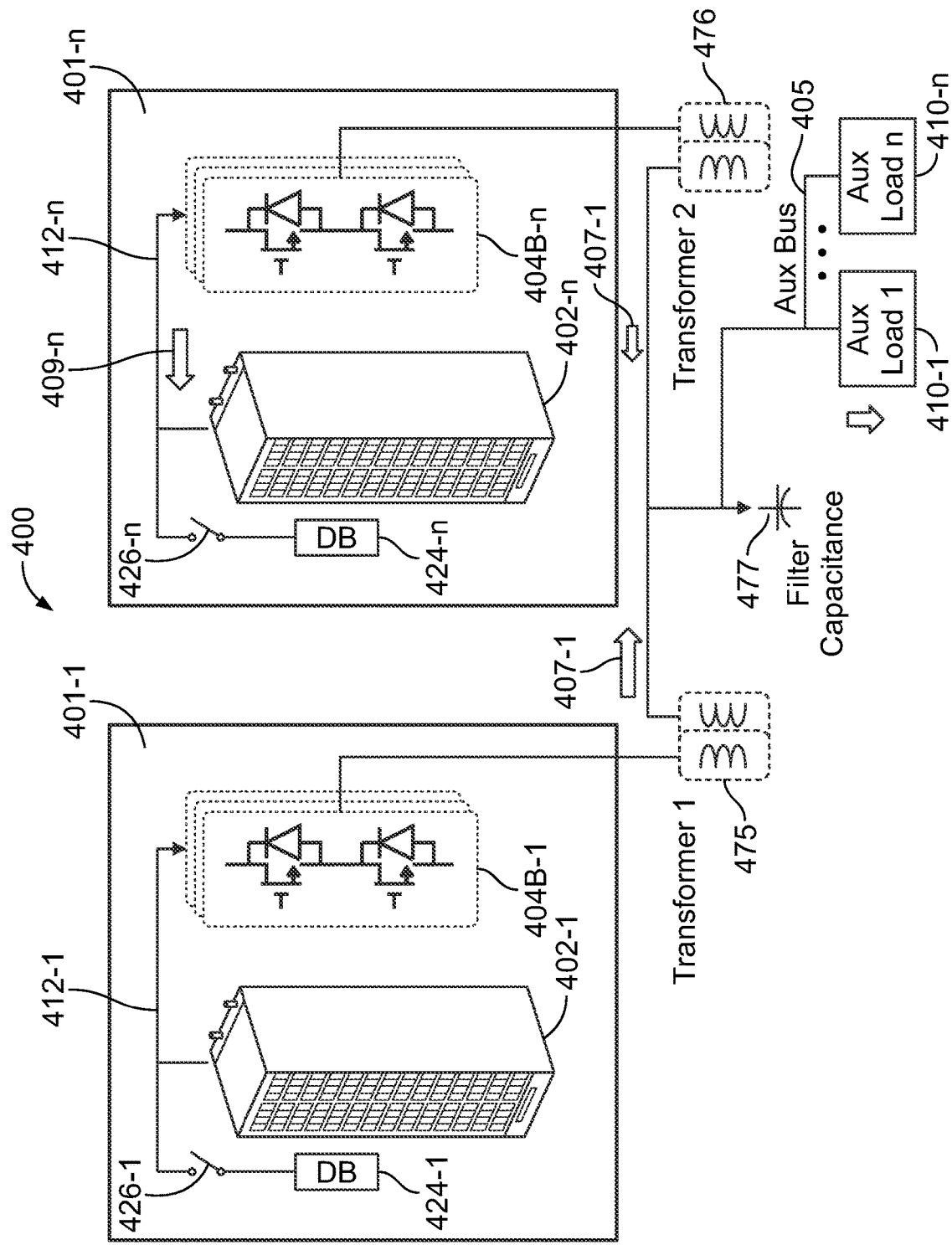
FIG. 13 is a schematic diagram of operation of an electric supply system in accordance with one embodiment.

Referring to FIG. 13, the electric supply system may be operated to power auxiliary loads 408-1, 408-n and charge one or more battery assemblies of one or more power supply assemblies 401-n. The controller may turn off or reduce the power supplied to the auxiliary loads 408-1, 408-n. A portion of the alternating current 407-1 provided by the second converter 404B-1 of the first power supply assembly 401-1 is provided to the auxiliary loads 408-1, 408-n as alternating current 481-1. As shown in the drawing, a first auxiliary load 408-1 is provided with an auxiliary load current 481-1 that may fully or partially power the first auxiliary load 408-1. One or more additional auxiliary loads 408-2 may be turned off, or provided with reduced current to provide reduced power to the additional auxiliary loads 408-n. The remainder of the alternating current 407-1 provided by the second converter 404B-1 of the first power supply is provided to the second converter 404B-2 of the second power supply assembly 401-2. The second converter 404B-2 of the second power supply assembly 401-2 rectifies the alternating current to direct current 409-2 that recharges the battery assembly 402-2 of the second power supply assembly 401-2.

Figure 14:
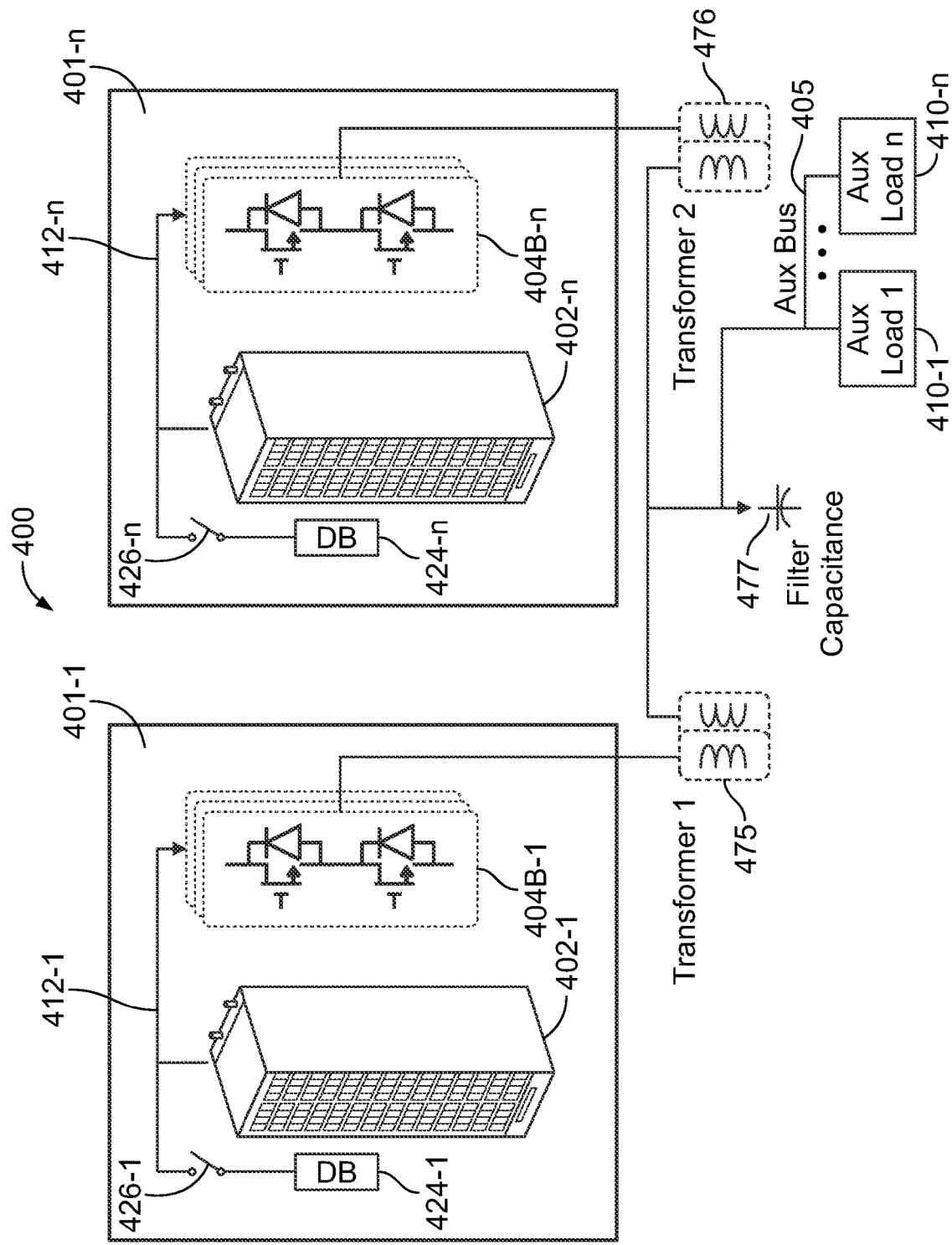
FIG. 14 is a schematic diagram of operation of an electric supply system in accordance with one embodiment.

Referring to FIG. 14, the controller may operate to transfer power from a first power supply assembly 401-1 to another power supply assembly 401-n through the second converters 404B-1, 404B-n used to provide power to the auxiliary loads 408-1, 408-n. The controller operates the second (auxiliary) converter 404B-1 of the first power supply assembly 401-1 to produce an AC voltage. The controller operates the second converter 404B-n of another power supply assembly 401-n as a PWM rectifier to provide a direct current to the battery assembly 401-n of the other power supply assembly 401-n to recharge the battery assembly 401-n of the other power supply assembly 401-n. Optionally, in a case where all of the auxiliary loads 408-1, 408-n are turned off, the controller may operate the auxiliary converters 404B-1, 404B-n in a manner similar to the operation of the first (traction motor) converters 404A-1, 404A-n described in relation to FIGS. 9-12.

Figure 15:
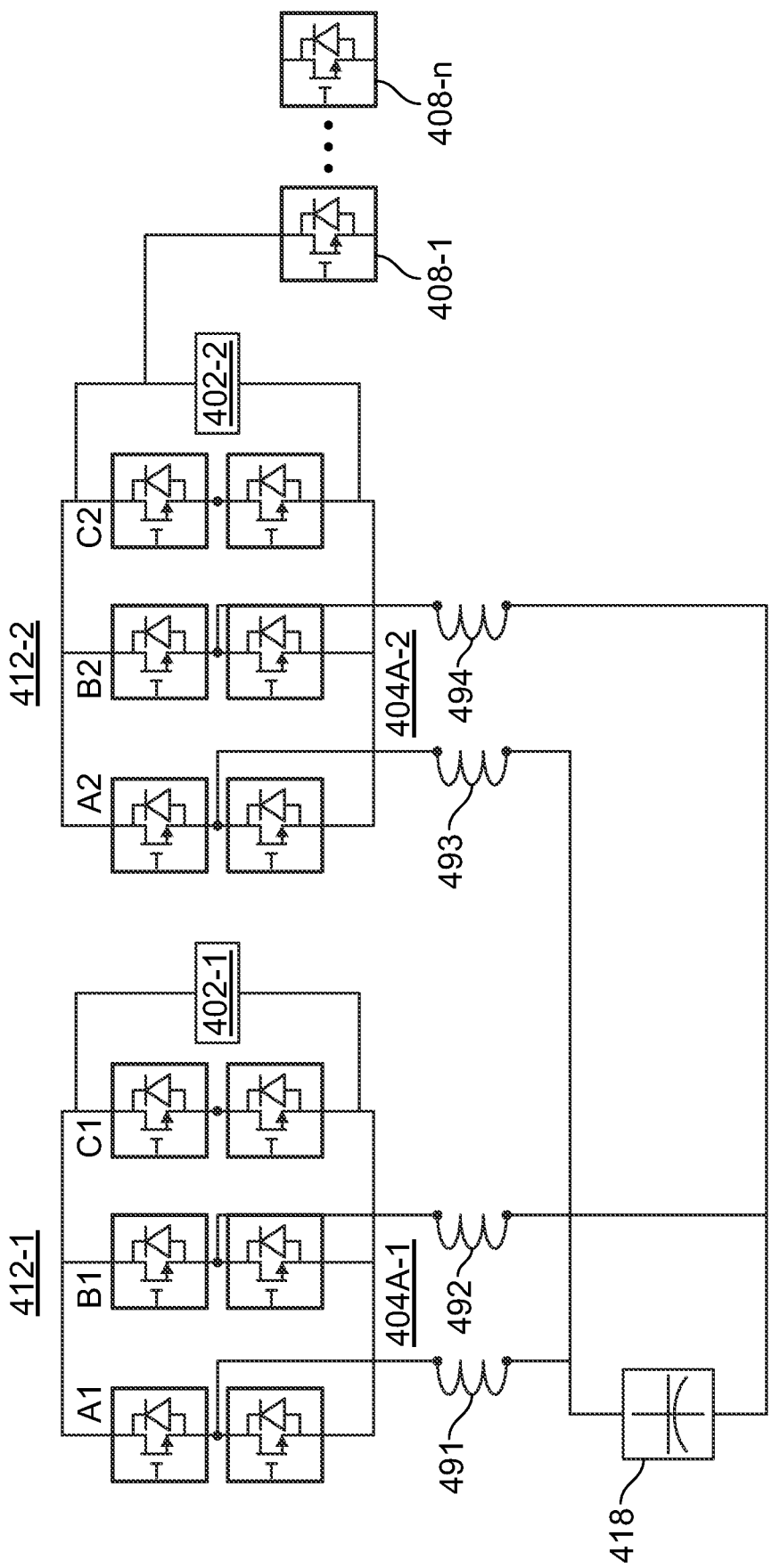
FIG. 15 is a schematic diagram of operation of an electric supply system in accordance with one embodiment.

Referring to FIG. 15, according to one embodiment the wayside source may be a DC source. In this embodiment the wayside source voltage is lower than the DC bus. When wayside DC power is connected, the voltage is filtered by the wayside source capacitor 418 onboard. A first DC bus 412-1 and a second DC bus 412-2 are connected to the wayside source capacitor. A pair of first inductors 491, 492 are connected between the wayside source and the first DC bus 412-1 to boost the voltage. A second pair of inductors 493, 494 are connected between the wayside source capacitor and the second DC bus 412-2 to boost the voltage. The first DC bus is not connected to any auxiliary loads and the second DC bus is connected to auxiliary loads 408-1,408-n. When wayside power is not connected and power transfer is needed from the first DC bus and second DC bus, one of the following four modes are used. In a first mode of operation the A phase A1 and the B phase B1 of the first inverter 404A-1 of the first DC bus 412-1 are run as a buck chopper or converter (step-down converter) and the A phase A2 and the B phase B2 of the first inverter 404A-2 of the second DC bus 412-2 may be run as a boost converter or chopper (step-up converter). The voltage of the first battery assembly 402-1 may be greater than the voltage of the wayside source capacitor since the first inverter 404A-1 is running as a step-down converter and the voltage of the second battery assembly 402-2 is greater than the voltage of the wayside source capacitor since the first inverter 404A-2 is running as a step-up converter. In the first mode of operation of the electric supply system according to this embodiment the electric supply system can charge the battery assemblies and run the auxiliary loads.

In a second mode of operation the A phase A1 and the B phase B1 of the first inverter 404A-1 of the first DC bus 412-1 are turned fully on and the A phase A2 and B phase B2 of the first inverter 404A-2 of the second DC bus 412-2 are turned off. The voltage of the first battery assembly 402-1 is equal to the voltage of the wayside source capacitor due to the full on nature of the first inverter 404A-1 and the voltage of the second battery assembly 402-2 is equal to the voltage of the wayside source capacitor due to passive rectification. In the second mode of operation the electric supply system can run the auxiliary loads. In this mode the battery charger function may not be used since the voltages are not controlled.

In a third mode of operation the A phase A1 and the B phase B1 of the first inverter 404A-1 of the first DC bus 412-1 are turned fully on and the A phase A2 and the B phase B2 of the first inverter 404A-2 of the second DC bus 412-2 are operated as a boost converter. The voltage of the first battery assembly 402-1 is equal to the voltage of the wayside source capacitor and the voltage of the second battery assembly 402-2 may be greater than the voltage of the wayside source capacitor. In the third mode of operation the electric supply system can charge the battery assemblies and run the auxiliary loads.

In a fourth mode of operation the A phase A1 and the B phase B1 of the first inverter 404A-1 of the first DC bus 412-1 are run as a buck converter and the A phase A2 and the B phase B2 of the first inverter 404A-2 of the second DC bus 412-2 are turned off. The voltage of the first battery assembly 402-1 is greater than the voltage of the wayside source capacitor and the voltage of the second battery assembly 402-2 is equal to the voltage of the wayside source capacitor. In the fourth mode of operation the electric supply system can charge the battery assemblies and run the auxiliary loads.

Figure 16:
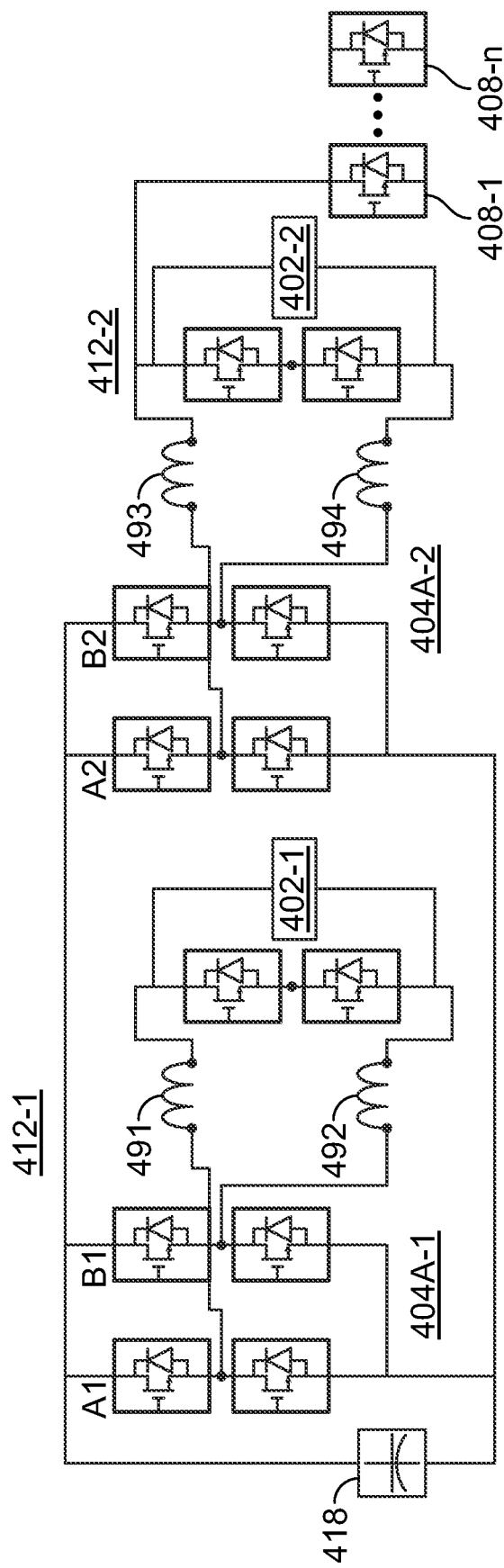
FIG. 16 is a schematic diagram of operation of an electric supply system in accordance with one embodiment.

Referring to FIG. 16, according to one embodiment the wayside source may be a DC source. In this embodiment the wayside source voltage is higher than the DC bus. When wayside DC power is connected, the voltage is filtered by the wayside source capacitor onboard. A first DC bus 412-1 and a second DC bus 412-2 are connected to the wayside source. A pair of first inductors 491, 492 are connected between the wayside source capacitor and the first DC bus 412-1 to buck (step-down) the voltage. A second pair of inductors 493, 494 are connected between the wayside source capacitor and the second DC bus 412-2 to buck (step-down) the voltage. The first DC bus 412-1 and the second DC bus 412-2 are symmetrically connected. The first DC bus is not connected to any auxiliary loads and the second DC bus is connected to auxiliary loads 408-1, . . .

408-*n*. When wayside power is not connected and power transfer is needed from a first DC bus and a second DC bus, one of the following four modes are used. In a first mode of operation the A phase A1 and the B phase B1 of the first inverter 404A-1 of the first DC bus 412-1 is run as a boost converter and the A phase A2 and the B phase B2 of the first inverter 404A-2 of the second DC bus 412-2 is run as a buck converter. The voltage of the first batter assembly 402-1 is lower than the voltage of the wayside source capacitor since the first inverter 404A-1 is running as a boost converter and the voltage of the second battery assembly 402-1 is lower than the voltage of the wayside source capacitor since the first inverter 404A-2 is running as a buck converter. In the first mode of operation the electric supply system can charge the battery assemblies and run the auxiliary loads.

In a second mode of operation the A phase A1 and the B phase B1 of the first inverter 404A-1 of the first DC bus 412-1 are turned off and the A phase A2 and the B phase B2 of the first inverter 404A-2 of the second DC bus 412-2 are operated as a buck converter. The voltage of the first battery assembly 402-1 is equal to the voltage of the wayside source capacitor due to passive rectification and the voltage of the second battery assembly 402-2 is less than the voltage of the wayside source capacitor. In the second mode of operation the electric supply system can run the auxiliary loads.

In a third mode of operation the A phase A1 and the B phase B1 of the first inverter 404A-1 of the first DC bus 412-1 are turned off and the A phase A2 and the B phase B2 of the first inverter 404A-2 of the second DC bus 412-2 are fully turned on. The voltage of the first batter assembly 402-1 is equal to the voltage of the wayside source capacitor due to passive rectification and the voltage of the second battery assembly 402-2 is equal to the voltage of the wayside source capacitor since the first converter 404A-2 is full on. In the third mode of operation, the electric supply system can run the auxiliary loads.

In a fourth mode of operation the A phase A1 and the B phase B1 of the first inverter 404A-1 of the first DC bus 412-1 are operated as a boost converter and the A phase A2 and the B phase B2 of the first inverter 404A-2 of the second DC bus 412-2 are turned on fully. The voltage of the first battery assembly 402-1 is lower than the voltage of the wayside source capacitor since the first inverter 404A-1 is running as a boost converter and the voltage of the second battery assembly 402-2 is equal to the voltage of the wayside source capacitor since the first converter 404A-2 is full on. In the fourth mode of operation the electric supply system can charge the battery assemblies and run the auxiliary loads.

An electric supply system for a vehicle system may include two or more energy storage devices that can store electric energy onboard one or more vehicles of the vehicle system and two or more buses each conductively coupling an energy storage device of the two or more energy storage devices with a corresponding load of a plurality of loads of the vehicle system. The electric supply system may further include a controller that can control conduction of electric current from one or more of the energy storage devices to one or more other buses to transfer energy to other energy storage devices or to other loads of the one or more other buses.

Optionally, the controller may operate a first converter for a first energy storage device of the two or more energy storage devices to output the electric current from the first energy storage device and the two or more buses may conduct a first portion of the electric current supplied by the first energy storage device to power one or more of the loads. The controller may control charging of a second energy storage device of the two or more energy storage devices by controlling a second converter to output a second portion of the electric current.

Optionally, a connection device may selectively couple each of the energy storage devices with a first load of the plurality of loads in a first state or with a power supply source in a second state. The controller may change the connection device to the second state to couple each of the energy storage devices to the power supply source to recharge each of the energy storage devices.

Optionally, the controller may transfer the electric current from the one or more energy storage devices to the one or more other energy storage devices while the connection device is in the second state and the power supply source is disconnected from the two or more energy storage devices.

Optionally, the controller may transfer the electric current from one or more energy storage devices to one or more second loads of the plurality of loads when the connection device is in the second state and the power supply source is disconnected from the two more energy storage devices.

Optionally, the controller may operate the first converter to output the electric current as alternating current and to operate the second converter as a pulse width modulation rectifier to charge the second energy storage device or provide power to a bus coupled to the second energy storage device.

Optionally, the controller may operate the first converter to output the electric current as single-phase alternating current.

Optionally, the plurality of loads may include one or more motors of the vehicle system.

A vehicle system electric supply system may include a plurality of power supply assemblies provided on one or more vehicles of the vehicle system. Each of the power supply assemblies may include a battery assembly including rechargeable energy storage devices, two or more converters coupled to the battery assembly, one or more loads on one or more vehicles of the vehicle system, each load coupled to at least one converter, and a bus conductively coupled with the battery assembly and the two or more converters, wherein at least one of the converters of each power supply assembly is coupled to at least one bus of one other power supply assembly. The vehicle system electric supply system may include a controller coupled to each of the plurality of power supply assemblies that can control conduction of electric current from at least one rechargeable energy storage device of one power supply assembly to a) at least one other rechargeable energy storage device to charge the other rechargeable energy storage device or b) one or more loads of the one or more power supply assemblies.

Optionally, each power supply assembly may include a connection device that can selectively couple each rechargeable energy storage device in a first state with a first load of the one or more loads or in a second state with a power supply source offboard the vehicles system. The controller may put the connection device in the second state to couple each rechargeable energy storage device to the power supply source to recharge each rechargeable energy storage device.

Optionally, the controller may transfer electric current from a first rechargeable energy storage device to a second rechargeable energy storage device when the connection device of the first rechargeable energy storage device and the second rechargeable energy storage device are in the second state and the power supply source is disconnected from the plurality of power supply assemblies.

Optionally, the controller may transfer electric current from a first rechargeable energy storage device to one or more loads of a second rechargeable energy storage device when each connection device of the first rechargeable energy storage device and the second rechargeable energy storage device are in the second state and the power supply source is disconnected from the power supply assemblies.

Optionally, the controller may operate a first converter of a first power supply assembly to produce a first electric current from a first rechargeable energy storage device as alternating current and to operate a second converter of a second power supply assembly as a pulse width modulation rectifier to charge a second rechargeable energy storage device or to provide power to the bus coupled to the second power supply assembly.

Optionally, the one or more loads may include one or more motors of the vehicle system. Optionally, the one or more motors may include one or more traction motors of the vehicle system.

A method may include directing a first energy storage device of a first power supply assembly of a plurality of power supply assemblies provided onboard a vehicle system to supply electric current to a first bus conductively coupling the first energy storage device to one or more first loads onboard the vehicle system. The method may further include conducting the electric current from the first energy storage device to one or more second buses of one or more second power supply assemblies of the plurality of power supply assemblies to recharge one or more second energy storage devices or to power one or more second loads of the one or more second power supply assemblies conductively coupled to the one or more second buses, the second loads being onboard the vehicle system.

Optionally, each power supply assembly may include a connection device that can couple an energy storage device of the power supply assembly with one or more loads in a first state or with a power supply source offboard the vehicle in a second state. The method may further include placing the connection device of the first power supply assembly in the second state to couple the first energy storage device to the one or more second buses of the one or more second power supply assemblies.

Optionally, the method may further include transferring the electric current from the first power supply assembly to the one or more second energy storage devices of the one or more second power supply assemblies when the connection device of the first power supply assembly is in the second state and the power supply source is disconnected from the first power supply assembly. Optionally, the method may further include transferring the electric current from the first power supply assembly to the one or more second loads of the one or more second power supply assemblies when the connection device of the first power supply assembly is in the second state and the power supply source is disconnected from the first power supply assembly.

Optionally, the method may further include connecting the first bus and one of the second buses to the power supply source and one or more of a) recharging one or more of the first energy storage device or the second energy storage devices or b) running one or more of the first loads or the second loads.

Optionally, the power supply source is an AC voltage source. Optionally, the power supply source is a DC voltage source.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The invention claimed is:

1. An electric supply system for a vehicle system, the electric supply system comprising:
   two or more energy storage devices of a plurality of energy storage devices configured to store electric energy onboard the vehicle system;
   two or more buses, each of the two or more buses conductively coupling an energy storage device of the two or more energy storage devices with a corresponding load of a plurality of loads of the vehicle system;

a controller configured to:
  control conduction of electric current from of the two or more energy storage devices to one or more other buses to transfer energy to one or more other energy storage devices of the plurality of energy storage devices or to other loads of the one or more other buses;
  operate a first converter for a first energy storage device of the two or more energy storage devices to output the electric current from the first energy storage device and the two or more buses are configured to conduct a first portion of the electric current supplied by the first energy storage device to power one or more loads of the plurality of loads;
  control charging of a second energy storage device of the two or more energy storage devices by controlling a second converter to output a second portion of the electric current to the second energy storage device while the two or more buses conduct the first portion of the electric current to power the one or more loads;
a connection device configured to selectively couple each of the plurality of energy storage devices with a first load of the plurality of loads in a first state or with a power supply source in a second state, wherein the controller is configured to change the connection device to the second state to couple each of the plurality of energy storage devices to the power supply source to recharge each of the plurality of energy storage devices; and
wherein the controller is configured to transfer the electric current from the two or more energy storage devices to the one or more other energy storage devices while the connection device is in the second state and the power supply source is disconnected from the two or more energy storage devices.

2. The electric supply system of claim 1, wherein the controller is configured to operate the first converter to output the electric current as alternating current and to operate the second converter as a pulse width modulation rectifier to charge the second energy storage device or provide power to a bus of the two or more buses coupled to the second energy storage device.

3. The electric supply system of claim 1, wherein the controller is configured to operate the first converter to output the electric current as single-phase alternating current.

4. The electric supply system of claim 1, wherein the plurality of loads comprises one or more motors of the vehicle system.

5. A vehicle system electric supply system comprising:
a plurality of power supply assemblies provided on one or more vehicles of a vehicle system, each of the plurality of power supply assemblies including:
  a battery assembly including rechargeable energy storage devices, two or more converters coupled to the battery assembly,
  one or more loads on the one or more vehicles of the vehicle system, each load coupled to at least one converter, and
  a bus conductively coupled with the battery assembly and the two or more converters, wherein at least one of the two or more converters of each of the plurality of power supply assemblies is coupled to at least one bus of one other power supply assembly of the plurality of power supply assemblies;

a controller coupled to each of the plurality of power supply assemblies, the controller configured to:
  control conduction of electric current from a first rechargeable energy storage device of one power supply assembly to a) a second rechargeable energy storage device to charge the second rechargeable energy storage device or b) the one or more loads of the plurality of power supply assemblies;
  operate a first converter for the first rechargeable energy storage device to output the electric current from the first rechargeable energy storage device and two or more buses are configured to conduct a first portion of the electric current supplied by the first rechargeable energy storage device to power the one or more loads;
  control charging of the second rechargeable energy storage device by controlling a second converter to direct a second portion of the electric current to the second rechargeable energy storage device while the two or more buses conduct the first portion of the electric current to power the one or more loads;
a connection device configured to:
  selectively couple each rechargeable energy storage device in a first state with a first load or in a second state with a power supply source offboard the vehicle system, wherein the controller is configured to put the connection device in the second state to couple each rechargeable energy storage device to the power supply source to recharge each rechargeable energy storage device; and
  transfer electric current from the first rechargeable energy storage device to the second rechargeable energy storage device when the connection device of the first rechargeable energy storage device and the second rechargeable energy storage device are in the second state and the power supply source is disconnected from the plurality of power supply assemblies.

6. The vehicle system electric supply system of claim 5, wherein the controller is configured to operate the first converter of a first power supply assembly of the plurality of power supply assemblies to produce a first electric current from the first rechargeable energy storage device as alternating current and to operate the second converter of a second power supply assembly of the plurality of power supply assemblies as a pulse width modulation rectifier to charge the second rechargeable energy storage device or to provide power to the bus coupled to the second power supply assembly.

7. The vehicle system electric supply system of claim 5, wherein the first load comprises a motor of the vehicle system.

8. A method, comprising:
directing a first energy storage device of a first power supply assembly of a plurality of power supply assemblies provided onboard a vehicle system to supply electric current to a first bus conductively coupling the first energy storage device to one or more first loads onboard the vehicle system;
conducting a first portion of the electric current from the first energy storage device to one or more second buses of one or more second power supply assemblies of the plurality of power supply assemblies to recharge one or more second energy storage devices; and
conducting a second portion of the electric current from the first energy storage device to power one or more second loads of the one or more second power supply assemblies conductively coupled to the one or more second buses while conducting the first portion of the electric current to the one or more second buses of the one or more second power supply assemblies, the one or more second loads being onboard the vehicle system;

connection device configured to couple an energy storage device of the plurality of power supply assemblies with the one or more first loads or the one or more second loads in a first state or with a power supply source offboard the vehicle system in a second state, the method further comprising placing the connection device of the first power supply assembly in the second state to couple the first energy storage device to the one or more second buses of the one or more second power supply assemblies;

transferring the electric current from the first power supply assembly to the one or more second energy storage devices of the one or more second power supply assemblies when the connection device of the first power supply assembly is in the second state and the power supply source is disconnected from the first power supply assembly; and transferring the electric current from the first power supply assembly to the one or more second loads of the one or more second power supply assemblies when the connection device of the first power supply assembly is in the second state and the power supply source is disconnected from the first power supply assembly.

9. The method of claim 8, further comprising:

connecting the first bus and one of the one or more second buses to the power supply source; and one or more of a) recharging one or more of the first energy storage device or the one or more second energy storage devices, or b) running the one or more first loads or the one or more second loads.

10. The method of claim 8, wherein the power supply source is an AC voltage source.

11. The method of claim 8, wherein the power supply source is a DC voltage source.

* * * * *